(12) United States Patent
Nagpal et al.

(10) Patent No.: US 10,754,998 B2
(45) Date of Patent: Aug. 25, 2020

(54) DATA LOSS PREVENTION USING MACHINE LEARNING

(71) Applicant: BANK OF AMERICA CORPORATION, Charlotte, NC (US)

(72) Inventors: Abhishek Nagpal, New Delhi (IN); Syed Luqman Ahmed, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 196 days.

(21) Appl. No.: 16/162,880

(22) Filed: Oct. 17, 2018

(65) Prior Publication Data
US 2020/0125775 A1 Apr. 23, 2020

(51) Int. Cl.
| | |
|---|---|
| G06F 21/88 | (2013.01) |
| G06K 9/00 | (2006.01) |
| G06F 21/62 | (2013.01) |
| G06N 20/00 | (2019.01) |

(52) U.S. Cl.
CPC .......... *G06F 21/88* (2013.01); *G06F 21/6209* (2013.01); *G06K 9/00456* (2013.01); *G06N 20/00* (2019.01)

(58) Field of Classification Search
CPC ...................................................... G06F 21/88
USPC ......................................................... 726/27
See application file for complete search history.

(56) References Cited

U.S. PATENT DOCUMENTS

| | | | |
|---|---|---|---|
| 8,199,965 B1 | 6/2012 | Basavapatna et al. | |
| 8,590,002 B1 | 11/2013 | Chebiyyam et al. | |
| 8,620,020 B2 | 12/2013 | More | |
| 8,863,304 B1 * | 10/2014 | Nagarkar | G06F 21/6245 713/182 |
| 9,064,125 B2 | 6/2015 | Frost | |
| 9,215,197 B2 | 12/2015 | Basavapatna et al. | |
| 9,760,724 B2 | 9/2017 | Frost | |
| 10,489,685 B1 * | 11/2019 | Rubin | H04L 63/10 |
| 2008/0016341 A1 * | 1/2008 | Staddon | G06F 21/6209 713/165 |

* cited by examiner

*Primary Examiner* — Peter C Shaw
(74) *Attorney, Agent, or Firm* — Michael A. Springs

(57) ABSTRACT

A data loss prevention device that includes a data loss prevention engine implemented by a processor. The data loss prevention engine is configured to receive data in transit to a target network device and to identify content within the data. The data loss prevention engine is configured to determine the content of the data comprises an image and to determine an image type for the image based on objects within the image, and to determine whether the image type matches a restricted image type from a set of restricted image types. The data loss prevention engine is further configured to block transmission of the data to the target network device in response to determining that the image type matches a restricted image type and forward the data to the target network device in response to determining that the image type does not match a restricted image type.

17 Claims, 3 Drawing Sheets

DATA LOSS PREVENTION USING MACHINE LEARNING

TECHNICAL FIELD

The present disclosure relates generally to information security, and more specifically to data loss prevention using machine learning.

BACKGROUND

One of the technical challenges associated with sharing data within a computer network is providing data access control. Existing systems typically provide an all or nothing approach for providing data access control based on file types. For example, existing approaches are only configured to restrict data transmission based on the presence of a file that is in particular file format. This approach is overly restrictive and cannot be adapted to support data that need to be accessible to some network devices while being restricted from others. This poses a technical challenge for computer systems because they are limited in their ability to distribute and share information while providing a data access control.

SUMMARY

One of the technical challenges associated with sharing data within a computer network is providing data access control. Existing systems typically provide an all or nothing approach for providing data access control based on file types. For example, existing approaches are only configured to restrict data transmission based on the presence of a file that is in particular file format. This approach is overly restrictive and cannot be adapted to support data that need to be accessible to some network devices while being restricted from others. This poses a technical challenge for computer systems because they are limited in their ability to distribute and share information while providing a data access control.

Another technical challenge associated with sharing data within a network is preventing unauthorized parties from accessing data in the network. For example, a bad actor may gain unauthorized access to a network to exfiltrate data from the network. In this example, the network bandwidth of the computer system is reduced due to the unauthorized downloads and data exfiltration from the computer system. The reduction of network bandwidth limits the system's ability to send and receive data which degrades the throughput of the system. Thus, it is desirable to protect computer systems and their resources from attacks such as data exfiltration.

The system disclosed herein provides several technical advantages which include the ability to selectively allow documents to be sent through a network based on the contents of the document. The disclosed system is trained using machine learning to identify restricted types of data within images and text of a document. This feature provides a technical improvement over existing systems which can only identify restricted text or file formats. For example, some existing systems are only configured to use keyword matching techniques to identify restricted types of text. These approaches are not suitable for detecting and identifying other types of restricted information such as schematics, flowcharts, chemical formulas, maps, etc. In contrast, the disclosed system provides the ability to detect and identify various representations (e.g. visual representations) of restricted information. As another example, existing systems may be configured to receive an email and to detect that a file (e.g. an image) is attached to an email. However, these systems do not access nor analyze the contents of the image itself. Existing systems only process the email based on the presence of a file that is in particular file format, which does not involve analyzing the actual contents of the file. In contrast, the disclosed system is configured to both detect that an image is attached to an email as well as analyze the contents of the image to determine whether the image contains any restricted types of data or information. This process provides improved functionality over existing approaches. For example, the disclosed system is able to distinguish between a document that contains restricted types of images and a document that contains other types of images.

In addition, this process provides increased network security from attacks such as data exfiltration. The disclosed system is configured to detect and block instances of data exfiltration which improves the network bandwidth utilization by preventing unauthorized data from leaving the network that would otherwise consume network resources. The improved network bandwidth utilization also means that the system is able to provide a higher throughput compared to existing systems.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system disclosed herein provides several technical advantages which include the ability to selectively allow documents to be sent through a network based on the contents of the document. The disclosed system is trained using machine learning to identify restricted types of data within images and text of a document. In other words, the system is trained to identify different types and classes of restricted text and images. This feature provides a technical improvement over existing systems which can only identify restricted file formats. For example, existing systems may be configured to receive an email and to detect that a file (e.g. an image) is attached to an email. However, these systems do not access nor analyze the contents of the image itself. Existing systems only process the email based on the presence of a file that is in particular file format, which does not involve analyzing the actual contents of the file. In contrast, the disclosed system is configured to both detect that an image is attached to an email as well as analyze the contents of the image to determine whether the image contains any restricted types of data or information.

Figure 1:
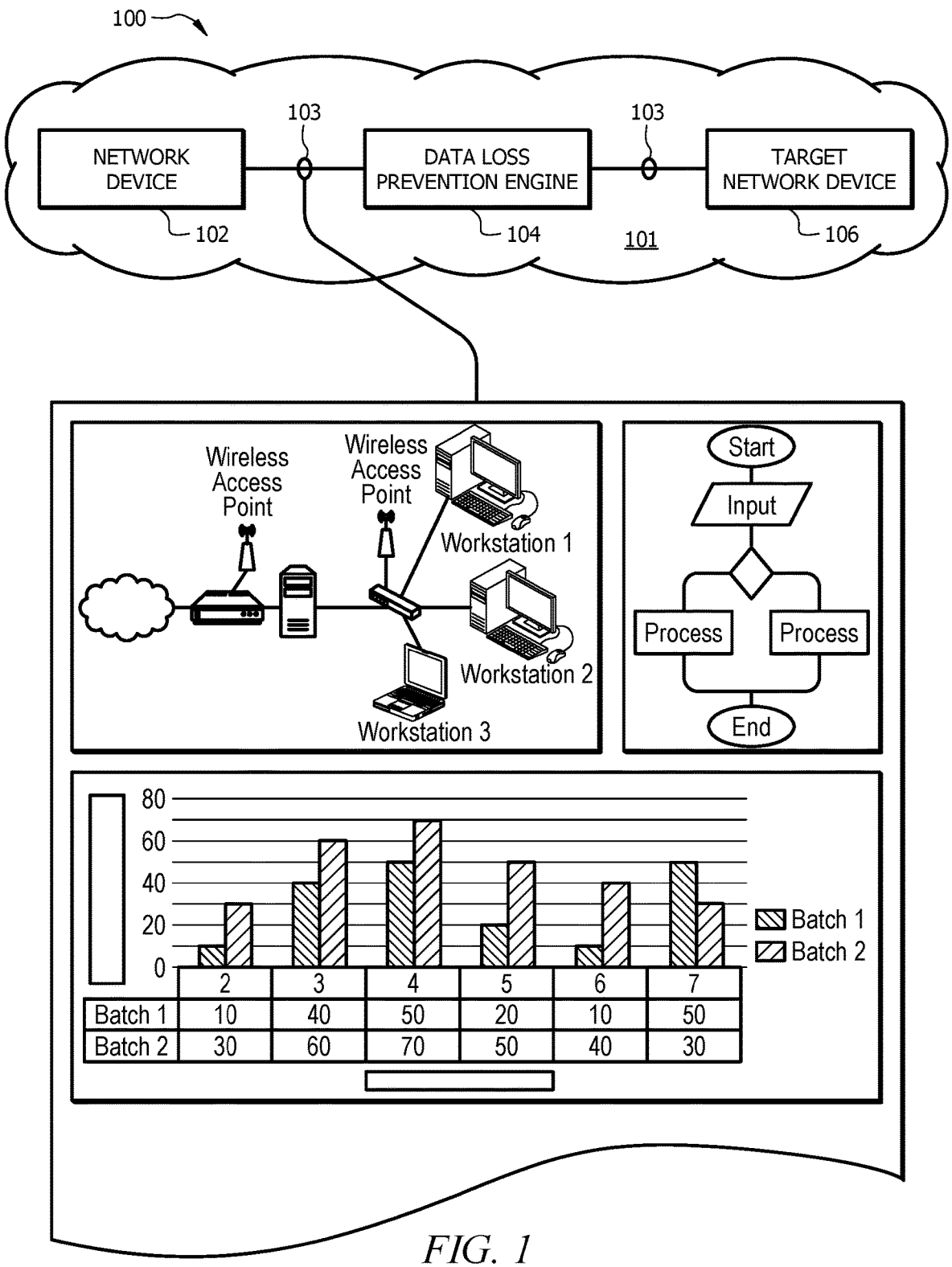
FIG. 1 is a schematic diagram of an embodiment of a system implementing data loss prevention using machine learning.
Figure 2:
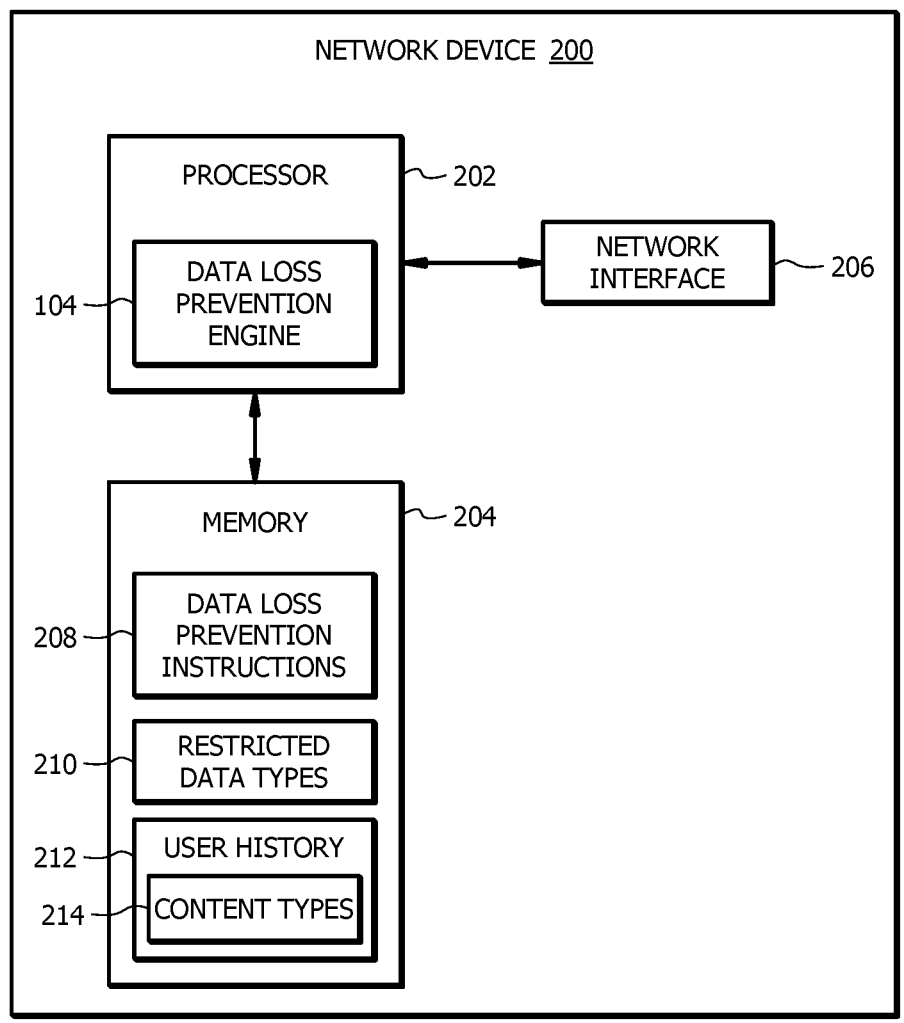
FIG. 2 is a schematic diagram of an embodiment of a network device configured to implement data loss prevention according to the present disclosure.
Figure 3:
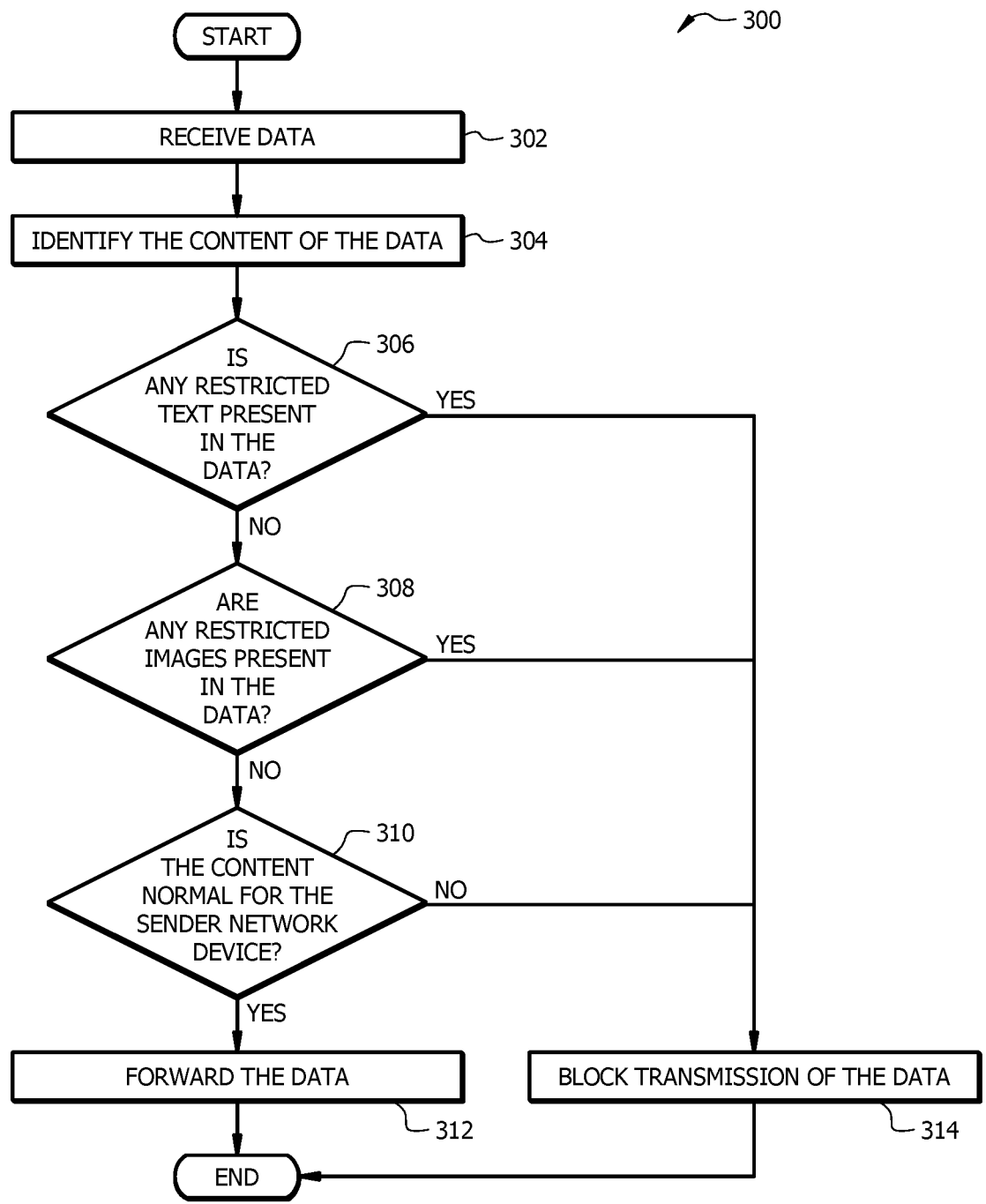
FIG. 3 is a flowchart of an embodiment of a data loss prevention method.

FIG. 1 is an example of a system configuration to analyze the contents of documents transmitted through a network to provide data loss prevention. FIG. 2 is an example of a network device configured to implement the disclosed data loss prevention process. FIG. 3 is an example of a process for analyzing the content of documents to provide data loss prevention within a network.

FIG. 1 is a schematic diagram of an embodiment of a system 100 implementing data loss prevention using machine learning. The system 100 comprises a plurality network devices (e.g. network devices 102 and 106) that are in signal communication with each other in a network 101. Each network device is configured to exchange data with other network devices in the system 100. FIG. 1 shows a network device 102 that is configured to send data 103 (e.g. documents) to a target network device 106. For example, the network device 102 may send an email with a document as an attachment to the target network device 106. As another example, the target network device 106 may be a printer and the network device 102 may send a document to the target network device 106 for printing.

Examples of network devices include, but are not limited to, computers, Internet-of-things (IoT) devices, mobile devices (e.g. smart phones or tablets), web clients, web servers, routers, modems, bridges, printers, or any other suitable type of network device. The network 101 is any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 101 may be configured to support any suitable type of communication protocol as would be appreciated by one of ordinary skill in the art upon viewing this disclosure.

Data Loss Prevention Engine

The system 100 comprises a data loss prevention engine 104 configured to selectively allow documents 103 to be sent through the network 101 based on the contents of the document 103. The data loss prevention engine 104 is generally configured to receive a data 103, to identify the contents of the data 103, and to determine whether to block or forward the data 103 based on the identified contents of the data 103. An example of the data loss prevention engine 104 in operation is described in FIG. 3. In one embodiment, the data loss prevention engine 104 may be implemented by the sending network device (e.g. network device 102) or a receiving network device (e.g. target network device 106). In other embodiments, the data loss prevention engine 104 may be implemented by a network device that forwards data toward the target network device 106.

The data loss prevention engine 104 may be configured to use one or more machine learning models to determine classification types for data 103 (e.g. text and images). For example, the data loss prevention engine 104 may be configured to identify images and text within the data 103 and to determine corresponding image types and text types for the identified images and text, respectively. Examples of image types may include, but are not limited to, people, logos, branding, schematic diagrams, blueprints, computer-aided design (CAD) drawings, network diagrams, flowcharts, chemical formulas, charts, tables, graphs, check images, maps, or any other suitable type of image. Examples of text types include, but are not limited to, personal information, product information, client information, information technology information, confidential information, financial information, network configuration information, account information, general information, addresses, or any other suitable class of text.

The data loss prevention engine 104 may be further configured to use machine learning models to identify restricted types of data 103. Data 103 may be restricted based on the format (e.g. image type) of the data 103 and/or the content of the data 103. The data loss prevention engine 104 is configured to use machine learning models that are trained using a training set of restricted types of data. The training set of restricted types of data may comprise previously identified malicious or confidential types of data. In one embodiment, training the data loss prevention engine 104 comprises providing the data loss prevention engine 104 with a training set of data that includes examples of text and images that have previously been associated with data loss (e.g. data exfiltration). For example, the data loss prevention engine 104 may receive the training set of data from a user or data repository. The data loss prevention engine 104 may perform any suitable machine learning techniques to identify a set of restricted data types for example, restricted image types and restricted text types. For instance, the data loss prevention engine 104 may obtain a training set of data that includes text and images with text. The data loss prevention engine 104 may apply the training set of data to a machine learning model to identify text strings, text formats, or any other characteristics that are typically present in restricted text (e.g. malware scripts). As another example, the data loss prevention engine 104 may apply the training set of data to a machine learning model to identify objects or any other characteristics that are typically present in restricted images. The data loss prevention engine 104 is configured to store the learned restricted data types in memory for other processes such as the data loss prevention method 300 described in FIG. 3. In one embodiment, the data loss prevention engine 104 may be configured to autonomously train itself to identify new restricted data types while processing data. For example, over time while the data loss prevention engine 104 is analyzing data 103, the data loss prevention engine 104 may identify restricted data types that have not been previously identified or stored as a known restricted data type. In this example, the data loss prevention engine 104 improves the operation of the system 100 by adapting to recognize new types of restricted data types that may lead to data loss or other types of attacks.

Images may be restricted based on the type of image or objects within the image. For example, the data loss prevention engine 104 may be configured to identify specific types of images (e.g. schematic diagrams or flowcharts) as restricted images. As another example, the data loss prevention engine 104 may be configured to identify images that contain certain types of objects as restricted images. Examples of objects include, but are not limited to, text, products, logos, branding, faces, equations, chemical formulas, check images, or any other suitable type of object in an image. Similarly, text may be restricted based on the content of the text. For example, the data loss prevention engine 104 may be configured to identify certain types of information (e.g. social security numbers, account information, and personal information) as restricted text. As another example, the data loss prevention engine 104 may be configured to identify known malicious text (e.g. malware scripts) as restricted text. The data loss prevention engine 104 is configured to access the contents of the data 103 to determine whether the data 103 comprises any text or images and to determine whether any of the identified text or images correspond with restricted types of data. The data loss prevention engine 104 then determines how to handle the data 103 based on the analysis of the contents of the data 103.

FIG. 2 is a schematic diagram of an embodiment of a network device 200 configured to implement data loss prevention according to the present disclosure. The network device 200 comprises a processor 202, a memory 204, and a network interface 206. The network interface 200 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a data loss prevention engine 104. In this way, processor 202 may be a special purpose computer designed to implement function disclosed herein. In an embodiment, the data loss prevention engine 104 is implemented using logic units, FPGAs, ASICs, DSPs, or any other suitable hardware. The data loss prevention engine 104 is configured similar to the data loss prevention engine 104 described in FIG. 1. An example of the data loss prevention engine 104 in operation is described in FIG. 3.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise read-only memory (ROM), random-access memory (RAM), ternary content-addressable memory (TCAM), dynamic random-access memory (DRAM), and static random-access memory (SRAM). The memory 204 is operable to store data loss prevention instructions 208, restricted data type information 210, user history 212, and/or any other data or instructions. The data loss prevention instructions 208 may comprise any suitable set of instructions, logic, rules, or code operable to execute the data loss prevention engine 104.

The restricted data type information 210 comprises information about restricted types of data content. For example, the restricted data type information 210 may comprise a set of restricted image types and/or a set of restricted text types. In one embodiment, the restricted data type information 210 may be generated based on the results from training a machine learning model. For example, the data loss prevention engine 104 may train a machine learning model using a training set of known or previously identified types of restricted data to identify a set of restricted image types and/or a set of restricted text types. The machine learning model may be trained using a process similar to the process described in FIG. 1. In another embodiment, a user may provide the set of restricted image types and/or the set of restricted text types. Examples of restricted data types include, but are not limited to, known malicious text (e.g. malware scripts), confidential text, specific image types, and images with certain types of objects within the images.

The user history 212 comprises information about previously sent or received documents 103 and their content. For example, the user history 212 comprises information about previously sent content types 214. For example, the data loss prevention engine 104 may be configured to identify the content of data 103 that is sent by a user or the network device 200 over time. The data loss prevention engine 104 stores the identified content types that are associated with a user or the network device 200. The data loss prevention engine 104 may use this information for detecting abnormal activity from a user or the network device 200. An example of this process is described in FIG. 3.

The network interface 206 is configured to enable wired and/or wireless communications. The network interface 206 is configured to communicate data between network devices in the system 100 and/or any other system or domain. For example, the network interface 206 may comprise a WIFI interface, a local area network (LAN) interface, a wide area network (WAN) interface, a modem, a switch, or a router. The processor 202 is configured to send and receive data using the network interface 206. The network interface 206 may be configured to use any suitable type of communication protocol as would be appreciated by one of ordinary skill in the art.

FIG. 3 is a flowchart of an embodiment of a data loss prevention method 300. The data loss prevention engine 104 implements method 300 to selectively allow or block the transmission of data 103 based on the contents of the data 103. For example, a network device 102 may attempt to send data 103 (e.g. a document) to a target network device 106 (e.g. a computer or a printer). The data loss prevention engine 104 will intercept the data 103 and analyze the contents of the data 103 to determine whether to allow or block the transmission of the data 103 to the target network device 106.

At step 302, the data loss prevention engine 104 receives data 103 (e.g. a document). In one embodiment, the data loss prevention engine 104 intercepts the data 103 as its being transmitted from a network device 102 to a target network device 106. As an example, the data loss prevention engine 104 may intercept an email that includes the data 103 as an attachment. As another example, the data 103 may be an email and the data loss prevention engine 104 is configured to intercept the email. As another example, the data loss prevention engine 104 may intercept the data 103 as its being transmitted to a printer for printing. As another example, the data loss prevention engine 104 may intercept the data 103 as its being uploaded to a data storage device (e.g. an external memory drive) or shared with another network device.

At step 304, the data loss prevention engine 104 identifies the content of the data 103. For example, the data loss prevention engine 104 may be configured to access or open a document and to perform image recognition, object recognition, or text recognition (e.g. optical character recognition) to identify images, objects, and text within the document. The data loss prevention engine 104 may employ any suitable technique for identify images, objects, and text within the document as would be appreciated by one of ordinary skill in the art upon viewing this disclosure.

At step 306, the data loss prevention engine 104 determines whether any restricted text is present in the data 103. The data loss prevention engine 104 may access the data 103 and determine that the content of the data 103 contains text. The data loss prevention engine 104 determines a text type for the identified text. The data loss prevention engine 104 may employ natural language processing and/or machine learning techniques to determine a classification type for the identified text. Examples of text types may include, but are not limited to, personal information, product information, client information, information technology information, confidential information, financial information, network configuration information, account information, general information, addresses, or any other class of text. The data loss prevention engine 104 compares the determined text type to a set of restricted text types to determine whether the determine whether the text type matches any of the restricted text types. For example, the data loss prevention engine 104 may determine that the data 103 comprises text that corresponds with a product information text type. The data loss prevention engine 104 compares the product information text type to a set of restricted text types to determine whether product information is a restricted type of data 103. The data loss prevention engine 104 determines that the data 103 contains restricted text when the text type matches one of the restricted text types. The data loss prevention engine 104 determines that the data 103 does not contain restricted text when the text type does not match any of the restricted text types. In one embodiment, the data loss prevention engine 104 may provide the identified text to a machine learning model to determine a classification type for the text and/or to determine whether the identified text corresponds with a restricted text type. The data loss prevention engine 104 proceeds to step 308 in response to determining that the data 103 does not contain any restricted text. Otherwise, the data loss prevention engine 104 proceeds to step 314 in response to determining that the data 103 contains restricted text.

At step 308, the data loss prevention engine 104 determines whether any restricted images are present in the data 103. The data loss prevention engine 104 may access the data 103 and determine that the content of the data 103 contains an image. The data loss prevention engine 104 determines an image type for the identified image. The data loss prevention engine 104 may employ image processing and/or machine learning techniques to determine a classification type for the identified image. Examples of image types may include, but are not limited to, people, logos, branding, schematics, blueprints, CAD drawings, network diagrams, flowcharts, chemical formulas, charts, tables, graphs, check images, maps, or any other suitable type of image. The data loss prevention engine 104 compares the determined image type to a set of restricted image types to determine whether the image type matches any of the restricted image types. For example, the data loss prevention engine 104 may determine that the data 103 comprises an image that contains a chemical formula which corresponds with a chemical formula image type. The data loss prevention engine 104 compares the chemical formula image type to a set of restricted image types to determine whether the chemical formula image type is a restricted type of data 103. As another example, the data loss prevention engine 104 may determine that the data 103 comprises an image that contains a data table which corresponds with a table image type. The data loss prevention engine 104 compares the table image type to a set of restricted image types to determine whether the table image type is a restricted type of data 103. The data loss prevention engine 104 determines that the data 103 contains restricted image when the image type matches one of the restricted image types. The data loss prevention engine 104 determines that the data 103 does not contain restricted images when the image type does not match any of the restricted image types. In one embodiment, the data loss prevention engine 104 may provide the identified image to a machine learning model to determine a classification type for the image and/or to determine whether the identified image corresponds with a restricted image type.

In one embodiment, the data loss prevention engine 104 may be further configured to analyze text within images that are in the data 103 for restricted text. For example, the data loss prevention engine 104 may determine that the data 103 comprises an image that contains a table with personal information which corresponds with a personal information text type. The data loss prevention engine 104 may identify text within an image and may perform a process similar to the process described in step 306 to determine whether the image contains any restricted text.

The data loss prevention engine 104 proceeds to step 310 in response to determining that the data 103 does not contain any restricted images. Otherwise, the data loss prevention engine 104 proceeds to step 314 in response to determining that the data 103 contains restricted images.

At step 310, the data loss prevention engine 104 determines whether the content is normal for the sender network device 102. The data loss prevention engine 104 determines a content type for the data 103 based on the content of the data 103. The content type identifies the general subject matter of the data 103. The data loss prevention engine 104 may use any combination of image recognition, object recognition, and text recognition to identify and classify the subject matter of the data 103. Examples of content types may include, but are not limited to, personal, confidential, product information, client information, business, legal, engineering, research and development, information technology, or any other suitable classification type. In one embodiment, the data loss prevention engine 104 compares the determined content type to a set of previously sent content types to determine whether the content type matches one of the previously sent content types. The data loss prevention engine 104 determines that the content type of the data 103 is normal for the sender network device 102 when the content type matches one of the previously sent content types. The data loss prevention engine 104 determines that the content type of the data 103 is abnormal for the sender network device 102 when the content type does not match any of the previously sent content types. In another embodiment, the data loss prevention engine 104 compares the determined content type to a set of restricted content types to determine whether the content type matches one of the restricted content types. The data loss prevention engine 104 determines that the content type of the data 103 is normal for the sender network device 102 when the content type does not match any of the restricted content types. The data loss prevention engine 104 determines that the content type of the data 103 is abnormal for the sender network device 102 when the content type matches one of the previously sent content types. The data loss prevention engine 104 proceeds to step 312 in response to determining that the content type of the data 103 is normal for the sender network device 102. Otherwise, the data loss prevention engine 104 proceeds to step 314 in response to determining that the content type of the data 103 is abnormal for the sender network device 102. In some embodiments, step 310 may be optional and may be omitted.

At step 312, the data loss prevention engine 104 forwards the data 103 to the target network device 106. Here, the data loss prevention engine 104 determines that the data 103 does not contain any restricted type of content and may be transmitted to the target network device 106.

At step 314, the data loss prevention engine 104 blocks the transmission of the data 103 to the target network device 106. In one embodiment, blocking the transmission of the data 103 comprises discarding or dropping the data 103 which prevents the data 103 from being transmitted to the target network device 106. In another embodiment, blocking the transmission of the data 103 comprises rerouting the data 103. For example, the data loss prevention engine 104 may reroute the data 103 to a safe zone in the network 101 for further analysis. As another example, the data loss prevention engine 104 may reroute the data 103 to an administrative group for approval before forwarding the data 103 to the target network device 106. In other examples, the data loss prevention engine 104 may reroute the data 103 to any other suitable location in the system 100 to prevent the data 103 from being transmitted to the target network device 106.

In one embodiment, the data loss prevention engine 104 is configured to send an alert in response to blocking the transmission of the data 103. The alert may comprise information about the sending network device 102, the target network device 106, the data 103, or any other suitable information. The data loss prevention engine 104 may send the alert using any suitable messaging protocol or technique. For example, the alert may be an email, a text message (e.g. a short message service (SMS) message), an application pop-up alert, or any other suitable type of message notification.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A data loss prevention device, comprising: a memory operable to store a set of restricted image types; and a data loss prevention engine implemented by a processor operably coupled to the memory, configured to: receive data in transit to a target network device; identify content within the data; determine the content of the data comprises an image; determine an image type for the image based on objects within the image; determine whether the image type matches a restricted image type from the set of restricted image types; block transmission of the data to the target network device in response to determining that the image type matches a restricted image type; and forward the data to the target network device in response to determining that the image type does not match a restricted image type, wherein: the memory is further operable to store a set of restricted text types; and the data loss prevention engine is further configured to: determine the image comprises text; determine a text type for the text; determine whether the text type matches a restricted text type from the set of restricted text types; block transmission of the data to the target network device in response to determining that the text type matches a restricted text type; and forward the data to the target network device in response to determining that the text type does not match a restricted text type.

2. The device of claim 1, wherein: the memory is further operable to store a set of restricted text types; and the data loss prevention engine is further configured to: determine the content of the data comprises text; determine a text type for the text; determine whether the text type matches a restricted text type from the set of restricted text types; block transmission of the data to the target network device in response to determining that the text type matches a restricted text type; and forward the data to the target network device in response to determining that the text type does not match a restricted text type.

3. The device of claim 1, wherein: the memory is further operable to store a set of previously sent content types; and the data loss prevention engine is further configured to: determine a content type for the content of the data; determine whether the content type matches a previously sent content type from the set of previously sent content types; block transmission of the data to the target network device in response to determining that the content type does not match a previously sent content type; and forward the data to the target network device in response to determining that the content type matches a previously sent content type.

4. The device of claim 1, wherein blocking the transmission of the data comprises rerouting the data.

5. The device of claim 1, wherein blocking the transmission of the data comprises discarding the data.

6. The device of claim 1, wherein the data loss prevention engine is further configured to send an alert in response to blocking transmission of the data.

7. The device of claim 1, wherein the target network device is a printing device.

8. The device of claim 1, wherein the data is an attachment to an email.

9. A data loss prevention method, comprising: receiving, by a data loss prevention engine implemented by a processor, data in transit to a target network device; identifying, by the data loss prevention engine, content within the data; determining, by the data loss prevention engine, the content of the data comprises an image; determining, by the data loss prevention engine, an image type for the image based on objects within the image; determining, by the data loss prevention engine, whether the image type matches a restricted image type from a set of restricted image types; blocking, by the data loss prevention engine, transmission of the data to the target network device in response to determining that the image type matches a restricted image type;

and forwarding, by the data loss prevention engine, the data to the target network device in response to determining that the image type does not match a restricted image type; determining, by the data loss prevention engine, the image comprises text; determining, by the data loss prevention engine, a text type for the text; determining, by the data loss prevention engine, whether the text type matches a restricted text type from a set of restricted text types; blocking, by the data loss prevention engine, transmission of the data to the target network device in response to determining that the text type matches a restricted text type; and forwarding, by the data loss prevention engine, the data to the target network device in response to determining that the text type does not match a restricted text type.

10. The method of claim 9, further comprising: determining, by the data loss prevention engine, the content of the data comprises text; determining, by the data loss prevention engine, a text type for the text; determining, by the data loss prevention engine, whether the text type matches a restricted text type from a set of restricted text types; blocking, by the data loss prevention engine, transmission of the data to the target network device in response to determining that the text type matches a restricted text type; and forwarding, by the data loss prevention engine, the data to the target network device in response to determining that the text type does not match a restricted text type.

11. The method of claim 9, further comprising: determining, by the data loss prevention engine, a content type for the content of the data; determining, by the data loss prevention engine, whether the content type matches a previously sent content type from the set of previously sent content types; blocking, by the data loss prevention engine, transmission of the data to the target network device in response to determining that the content type does not match a previously sent content type; and forwarding, by the data loss prevention engine, the data to the target network device in response to determining that the content type matches a previously sent content type.

12. The method of claim 9, wherein blocking the transmission of the data comprises rerouting the data.

13. The method of claim 9, wherein blocking the transmission of the data comprises discarding the data.

14. The method of claim 9, further comprising sending, by the data loss prevention engine, an alert in response to blocking transmission of the data.

15. A computer program product comprising executable instructions stored in a non-transitory computer readable medium such that when executed by a processor causes the processor to implement a data loss prevention engine configured to: receive data in transit to a target network device; identify content within the data; determine the content of the data comprises an image; determine an image type for the image based on objects within the image; determine whether the image type matches a restricted image type from a set of restricted image types; block transmission of the data to the target network device in response to determining that the image type matches a restricted image type; forward the data to the target network device in response to determining that the image type does not match a restricted image type; determine the image comprises text; determine a text type for the text; determine whether the text type matches a restricted text type from a set of restricted text types; block transmission of the data to the target network device in response to determining that the text type matches a restricted text type; and forward the data to the target network device in response to determining that the text type does not match a restricted text type.

16. The computer program product of claim 15, further comprising instructions that when executed by the processor causes the processor to: determine the content of the data comprises text; determine a text type for the text; determine whether the text type matches a restricted text type from a set of restricted text types; block transmission of the data to the target network device in response to determining that the text type matches a restricted text type; and forward the data to the target network device in response to determining that the text type does not match a restricted text type.

17. The computer program product of claim 15, further comprising instructions that when executed by the processor causes the processor to: determine a content type for the content of the data; determine whether the content type matches a previously sent content type from the set of previously sent content types; block transmission of the data to the target network device in response to determining that the content type does not match a previously sent content type; and forward the data to the target network device in response to determining that the content type matches a previously sent content type.

* * * * *